US006405366B1

(12) United States Patent
Lorenz, Sr. et al.

(10) Patent No.: US 6,405,366 B1
(45) Date of Patent: Jun. 11, 2002

(54) MULTI-LAYERED SOFTWARE APPLICATION INTERFACE ARCHITECTURE

(75) Inventors: Lee A. Lorenz, Sr., Fenton; David A. Faller, Saginaw; James C. Aldrich, Fenton, all of MI (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 09/322,672

(22) Filed: May 28, 1999

(51) Int. Cl.[7] .................................................. G06F 9/44
(52) U.S. Cl. ........................ 717/107; 717/108; 717/116; 717/109
(58) Field of Search ................................. 717/1–9, 100, 717/104, 108, 110, 116, 107, 109; 709/217–219

(56) References Cited

U.S. PATENT DOCUMENTS 5,978,579 A  * 11/1999  Buxton et al. ............... 717/100
6,256,780 B1 *  7/2001  William et al. .............. 717/107
6,327,698 B1 * 12/2001  Kolluru et al. .............. 717/107

OTHER PUBLICATIONS

Windyn SF901 Operators Manual, Published Feb. 1998.*

* cited by examiner

Primary Examiner—Tuan Q. Dam
Assistant Examiner—Chuck Kendall
(74) Attorney, Agent, or Firm—Baker Botts, LLP

(57) ABSTRACT

A multi-layered software architecture (90) comprises a software application layer (10), a predefined file filter interface layer (106) operable to perform basic file functions, and a data standard interface layer (94, 104, 114) having a plurality of standard methods for accessing data of a data type. Further, a first plug-in (91, 92) is provided that is operable to access a first data format (34, 31) of the data type according to the data standard interface layer (94, 104, 114), and a second plug-in (96, 98, 100, 102) is provided that is operable to access a second data format (41, 40, 38, 42) of the data type according to the data standard interface layer (94, 104, 114).

33 Claims, 3 Drawing Sheets

MULTI-LAYERED SOFTWARE APPLICATION INTERFACE ARCHITECTURE

TECHNICAL FIELD OF THE INVENTION

This invention is related in general to the field of computer software, and more particularly, to a multi-layered software application interface architecture.

BACKGROUND OF THE INVENTION

Software applications often are required to interface with data in several diverse formats. This is particularly true of embedded system software. Embedded system software has become extremely complex, particularly in the automotive industry. Increased competition has also forced automotive companies to reduce their costs and time to market. Component outsourcing is a widely used method for reducing costs. Outsourcing embedded system hardware reduces cost per vehicle, but it increases the time and costs in engineering due to the effects on software development and calibration development. Calibration development is the process by which certain values in the software of the embedded systems are adjusted or tailored. Because each outsourced hardware supplier uses its own set of hardware and software tools for software and calibration development, engineers must learn these new tools and adapt them into their processes. This learning curve can be quite significant relative to the total development time. The new tools often do not meet engineering requirements and cannot be used. This results in the adaptation or enhancement of existing tools to work in the new hardware and software environment. The resultant costs can escalate out of control, which entirely defeats the cost-cutting purpose behind outsourcing.

SUMMARY OF THE INVENTION

It has been recognized that it is desirable to provide a multi-layered software application interface architecture which uses modular plug-ins to access data of diverse types and formats. A standard interface is defined for each data type and the data are accessed according to the predefined standard interface.

In one aspect of the invention, a multi-layered software architecture comprises a software application layer, a predefined file filter interface layer operable to perform basic file functions, and a data standard interface layer having a plurality of standard methods for accessing data of a data type. Further, a first plug-in is provided that is operable to access a first data format of the data type according to the data standard interface layer, and a second plug-in is provided that is operable to access a second data format of the data type according to the data standard interface layer.

In another aspect of the invention, an embedded software calibration system comprises a software tool operable to calibrate constants in a software application, and at least one data interface plug-in in communications with the software tool and operable to access files of a first data type having a predetermined data format.

In yet another aspect of the invention, an embedded system software tool comprises a software tool. There is further provided a binary interface plug-in in communications with the software tool and operable to access binary data files having a predetermined binary data format, a symbolic interface plug-in in communications with the software tool and operable to access symbolic data files having a predetermined symbolic data format, and a device interface plug-in in communications with the software tool and operable to access data stored in a device type having a predetermined data format.

In yet another aspect of the present invention, a method of accessing data comprises the steps of selecting a data interface plug-in in response to a specific data type and format of input data, and then accessing the input data according to a predetermined interface standard for the specific data type.

One technical advantage of the invention provides a standard interface for accessing data of diverse types and formats so that plug-ins or modular code components may be developed for accessing each data type and data format. These code components can be easily plugged into software applications that support them. As a result, software applications may be developed according to the standard interface and be executed with plug-ins which are also coded according to the standard interface. In this manner, the software application need not be modified or expanded in any way in order to support new data types or data formats.

BRIEF DESCRIPTION OF THE DRAWINGS

For a better understanding of the present invention, reference may be made to the accompanying drawings, in which.

DETAILED DESCRIPTION OF THE INVENTION

Figure 1:
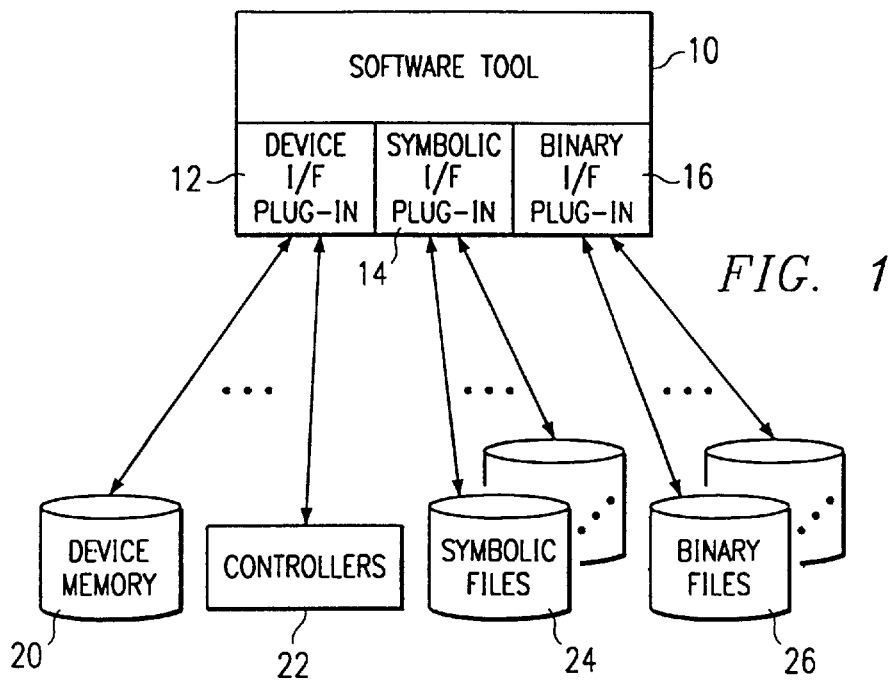
FIG. 1 is a simplified block diagram of an embodiment of a software tool having a number of plug-ins for interfacing with data in a variety of formats according to the teachings of the present invention.

FIG. 1 is a simplified block diagram of an embodiment of a software tool 10 having a number of plug-ins 12–16 for interfacing with data in a variety of formats according to the teachings of the present invention. Software tool 10 may be any software application that is required to read, write, or otherwise access data in diverse formats. For example, software tool 10 may include a device interface plug-in 12 for interaction with embedded devices such as device memory 20 and controllers 22. A symbolic interface plug-in 14 may be provided for accessing symbolic files 24, or files with symbolic data content. Symbolic files 24 may arrange its data in more than one format. Software tool 10 may also include a binary interface plug-in 16, which is used to access binary files 26, or files with binary data content. Binary files 26 may arrange its data in more than one format.

Device, symbolic and binary interface plug-ins 12–16 are preferably programmed in an object-oriented or object-oriented like manner pursuant to Microsoft's Component Object Model (COM) or its distributed version (DCOM), a set of extensions to COM (COM+), Common Object Request Broker Architecture (CORBA), and like technologies. A plug-in is basically a separate module distinct from the main application, the software tool in this example, that uses a dynamically loadable library (DLL) which allows the plug-in to communicate with the main program with a standard set of functions or methods.

In an embedded software development and calibration process, files containing binary data format are generated by the compile process. Symbolic mappings or files containing symbolic data format may be also generated by the compiling process. Symbolic files generally provide address mapping information for the compiled code, including the address location of calibration constants. A software calibration tool is required to access or read the binary and symbolic files in order to provide the engineer access to the calibration values and to alter them. In automotive applications, for example, the calibration values may be modified pursuant to different emission standards or to provide a range of performance levels. After calibration, the software is burned, downloaded or otherwise transferred into memory devices such as flash memory, read only memory (ROM) and the like, which is then installed in the vehicle. The software calibration tool may be used to access device memory, controllers, or vehicle instrumentation to further provide the engineers the ability to fine tune the calibration values with the software running on board. When the software calibration tool employs the interface plug-ins 12–16 of the present invention, the software calibration tool may access the files of diverse data formats without altering or expanding the software code of the tool itself. Therefore, if the calibration tool is required to interface with a new data format, a COM object plug-in for interfacing with the new data format may be coded and provided to enable the calibration tool to access the new data file format.

Figure 2:
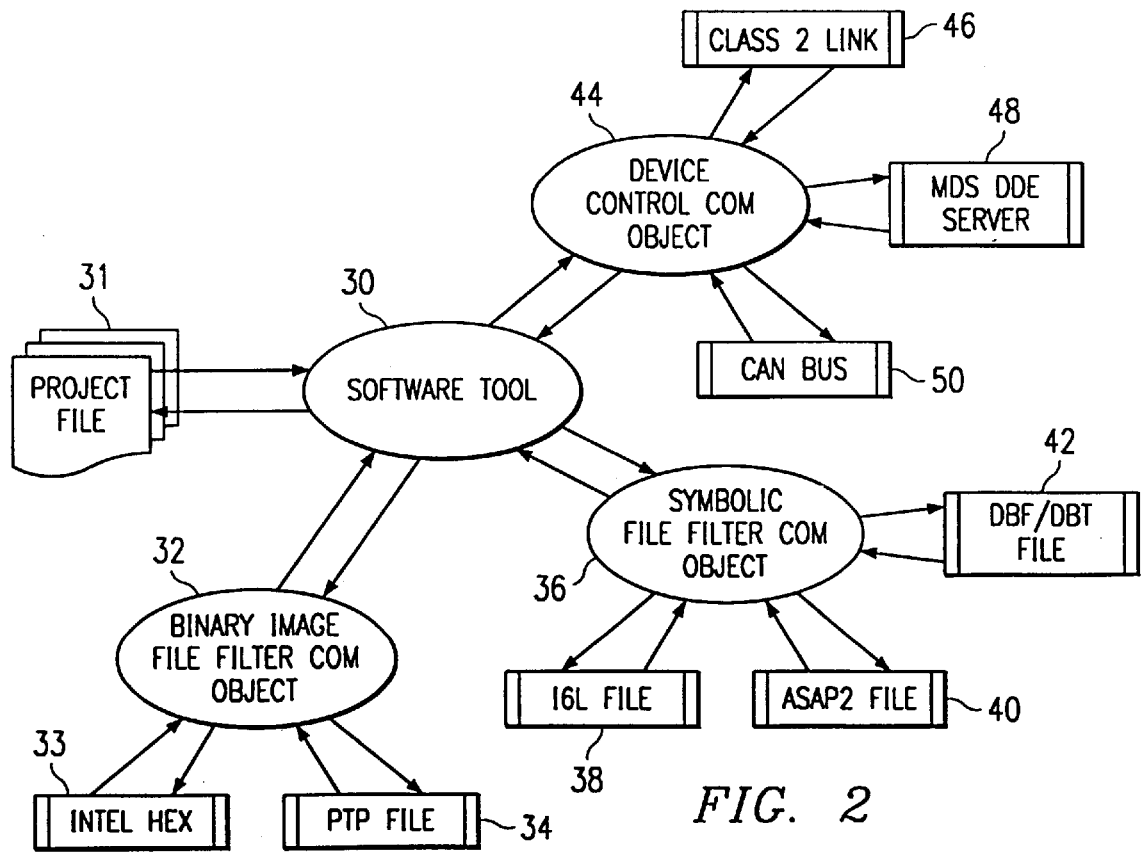
FIG. 2 is a simplified data flow diagram of an embodiment of the software tool with object oriented plug-in interfaces for accessing data in a variety of formats according to the teachings of the present invention.

FIG. 2 is a simplified data flow diagram of an embodiment of the software tool with object oriented plug-in interfaces for accessing data in a variety of formats according to the teachings of the present invention. A software application such as a software tool 30 stores and reads project files 31. Project files 31 may be stored in memory that is resident on the platform that software tool is executing on, or the memory may be a separate memory device. The project file 31 may be stored in random access memory (RAM), hard disk, or in a portable computer readable medium which is readily accessible. Software tool 30 accesses binary data through one or more binary image file filter COM objects 32, which is operable to access binary files 33 and 34. Binary file 33 is in an Intel Hex format and binary file 34 is in a PTP file format. These are but two of many possible binary file formats. Access to symbolic files 38–42 is done via one or more symbolic file filter COM objects 36. Symbolic files 38–42 may include I6L files, ASAP2 files, and DBF/DBT files 42. The data formats of the binary and symbolic files are determined by the language the software tool is coded in, the compiler that compiled the code, and the format specified by the intended application of the code. Therefore, it is foreseeable that many data formats exist and that more data formats are likely to be developed in the future.

Software tool 30 also interfaces with hardware or devices, such as a Class 2 Link 46, an MDS (Modular Development System) DDE server 48 and a control area network (CAN) bus 50, via one or more device control COM objects 44. Whereas binary and symbolic file filter COM objects 32 and 36 are operable to interface with files, device control COM object 44 is operable to interface with data already downloaded or transferred into embedded devices and controllers.

Figure 3:
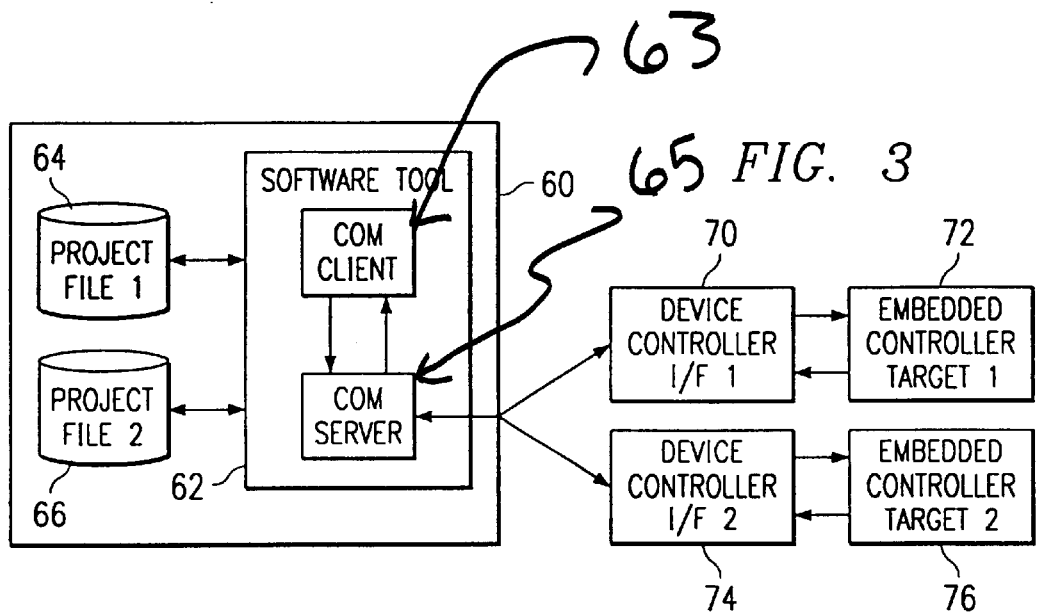
FIG. 3 is a simplified block diagram of an embodiment of the software tool of the present invention interfacing with embedded controllers and devices.

FIG. 3 is a simplified block diagram of an embodiment of the software tool of the present invention interfacing with embedded controllers and devices using device control COM objects. On a computing platform 60, Software tool 62 may include device control COM objects 63 that act as clients and device control COM objects 65 that act as servers. In particular, device control COM servers 65 are the plug-ins, and software tool 62 is the client. Computing platform 60 may be any personal computer, laptop computer, notebook computer, or any suitable computer that includes a display and user input device. Software tool 62 is operable to access one or more project files 64 and 66, which are stored in some form of memory or data storage device. Project files 64 and 66 are created using calibration data and symbolic information. Device control COM server object 65 is operable to communicate with embedded controller targets 72 and 76 via respective device controller interfaces 70 and 74.

In operation, software tool 62 loads or reads one or more project files 64 and 66 into memory from a disk, for example. Software tool 62 may be a calibration editor used by engineers to change or fine tune calibration constants in a software application. Software tool 62 may allow the engineer to look at one or more project files simultaneously to compare the calibration values. The changed calibration values, along with the rest of the project file, may then be uploaded to respective embedded controller target 72 and 76 using a client/server connection via COM client and server 63 and 65 and device controller interfaces 70 and 74.

Figure 4A:
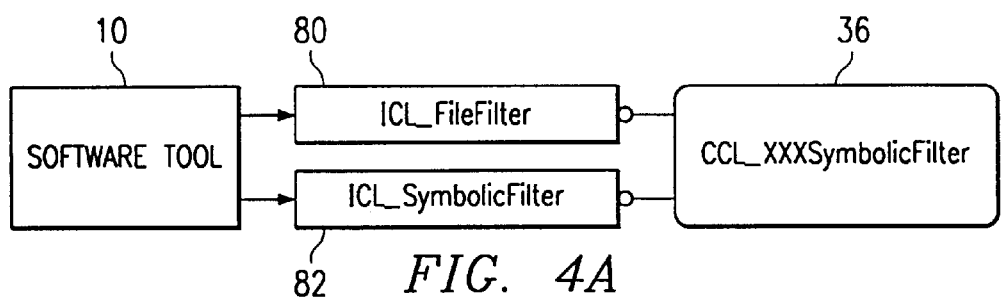
FIGS. 4A–4C are interface diagrams of the plug-in interface objects according to the teachings of the present invention.
Figure 4B:
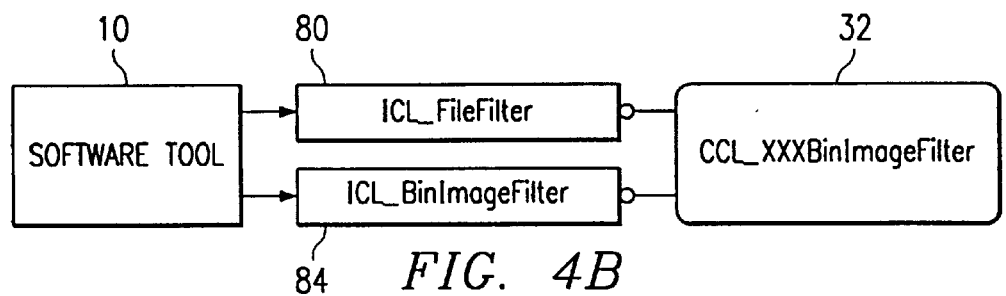
Figure 4C:
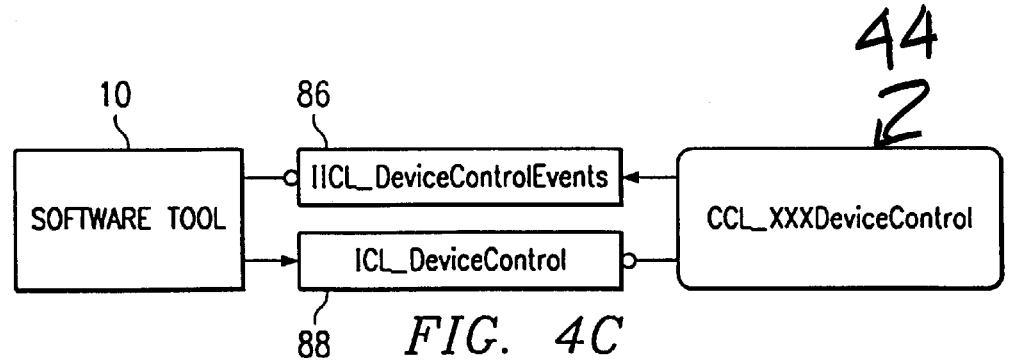

FIGS. 4A–4C are interface diagrams of the plug-in interface objects according to the teachings of the present invention. In FIG. 4A, all symbolic file filter objects 36, having the exemplary name CCL_XXXSymbolicFilter, share a common ICL_FileFilter 80 and ICL_SymbolicFilter 82. The string "XXX" in the exemplary object name is used to denote a specific filter for a specific symbolic data format, such as ASAP2, I6L, DBF/DBT, etc. ICL_FileFilter 80 is a standard interface which exposes functionality to handle file open and save requests, as well as providing source, version, and date information for synchronizing with the project file. ICL_FileFilter 80 may have the following exemplary interface methods:

| Method | Functionality |
|---|---|
| Configure ( ) | displays a dialog that allows the user to set input/output preferences for the filter's read/write functions |
| GetExtensions ( ) | gets the file extensions that are supported by this filter |
| LoadConfiguration ( ) | sets the filter's input/output preferences by passing a previously saved set to the filter |
| ReadFile ( ) | reads the binary file into the current instance of the COM object or filter |
| ReadFileDescription ( ) | retrieves the description of a given binary file |
| Readversion ( ) | retrieves a timestamp for a given binary file |
| SaveConfiguration ( ) | saves the filter's input/output preferences to a given stream |
| VerifyLocation ( ) | determines if a given timestamp matches the current timestamp for a given binary file |
| WriteFile ( ) | writes the filter's current data to a given binary file, in the proper format for the type of filter being used |

ICL_SymbolicFilter 82 is an interface specific to the task of importing and exporting symbolic data having a predetermined symbolic data format. This interface provides a standard interface to symbolic information. The symbolic information is stored in memory internally to the COM object. The organization of the data entities follow a logical format, grouping calibration labels under their respective modules, and further subdividing data structures into their base types. An exemplary organization structure follows:

```
             - module    - calibration
                         - calibration    - member 1 - sub-type
root                                      - member 2 - sub-type
                                          - member 3 - sub-type
             - module    - calibration
                         - calibration    - array - sub-array - base-type
```

It may be seen that the symbolic information is arranged in a tree-like structure, where a node may have a parent node, one or more sibling nodes, and one or more child nodes. The root object or entity provides a common starting point for any application to read in symbolic data from any symbolic filter object. ICL_SymbolicFilter 82 may include the following exemplary interface methods:

| Method | Functionality |
|---|---|
| AddSymbolicData ( ) | adds a new entity from the given symbolic data under the given parent entity in the COM internal data structure |
| AddNewSymbolicData ( ) | creates a new entity in this instance of the COM based on the type and allocates memory for that specific type |
| ClearSymbolic ( ) | deletes the entity associated with the given ID, and any child entities in memory from this instance of the COM object |
| GetHead ( ) | loads the head entity's properties into this instance of the COM object |
| GetFirstChild ( ) | loads the first child entity's properties into this instance of the COM object |
| GetNext ( ) | loads the next entity's properties into this instance of the COM object |
| GetPrev ( ) | loads the previous entity's properties into this instance of the COM object |
| Getparent ( ) | loads the parent entity's properties into this instance of the COM object |
| GetSymbolicDataByID ( ) | loads in the current entity's properties into this instance of the COM object |
| GetSymbolicDataByName ( ) | retrieves the symbolic data associated with the named entity |
| SiblingCountByID ( ) | returns the number of memory sibling entities for the given ID in the current instance of this COM object |
| ChildCountByID ( ) | returns the number of memory child entities for the given ID in the current instance of this COM object |
| QueryBenchValue Interface ( ) | queries the symbolic filter COM object to determine if the current location supports bench values |

Both interfaces 80 and 82 may be replicated for plug-ins of each symbolic data format, thus providing a standard method for accessing symbolic files.

In FIG. 4B, all binary file filter objects 32, having the exemplary name CCL_XXXBinImageFilter, share a common ICL_FileFilter 80 and ICL_BinImageFilter 84. The string "XXX" in the exemplary object name is used to denote a specific filter for a specific binary image data format, such as Intel Hex, PTP, etc. ICL_FileFilter 80 is the same standard interface which exposes functionality to handle file open and save requests, as well as providing source, version, and date information for synchronizing with the project file. ICL_BinImageFilter 84 is an interface specific to the task of importing and exporting raw binary images from a file. ICL_BinImageFilter 84 may include the following interface methods:

| Method | Functionality |
|---|---|
| AddImageData ( ) | adds image data to the filter's current data store |
| AddNewImage ( ) | adds a new image in this instance of the COM object, |

| Method | Functionality |
|---|---|
| | with the data initialized to zero |
| ClearImages ( ) | deletes all images from the filter's current image store |
| GetImageDataBy Address ( ) | reads image data at the specified address location |
| GetImageDataBy Index ( ) | returns the indexed image to the filter's client |
| SetCurrent-ImageByAddress ( ) | loads the image containing the given address as the filter's current image |
| SetCurrent-ImageByIndex ( ) | loads the indexed image as the filter's current image |

Both interfaces 80 and 84 may be replicated for plug-ins of each binary image data format, thus providing a standard method for accessing binary data files.

In FIG. 4C, all device control objects 44, having the exemplary name CCL_XXXDeviceControl, share a common ICL_DeviceControlEvents 86 and ICL_DeviceControl 88. The string "XXX" in the exemplary object name is used to denote a specific filter for a specific device, such as CAN, Class 2 Link, MDS DDE, etc. ICL_DeviceControlEvents 86 is an interface for notifying the software tool when an asynchronous event has taken place. In these instances, the software tool acts as a server. ICL_DeviceControlEvents 86 may include the following interface methods:

| Method | Functionality |
|---|---|
| WriteComplete ( ) | called whenever a block of data has been written asynchronously to the device |
| ReadComplete ( ) | called whenever a block of data has been read asynchronously from the device |
| AbortRequestComplete ( ) | called when the device control object has handled the abort request |
| DeviceStatusChanged ( ) | called whenever the device's status has been changed |

ICL_DeviceControl 88 is a standard interface for the software tool to communicate to all devices.

ICL_DeviceControl 88 may include the following interface methods:

| Method | Functionality |
|---|---|
| WriteAsynch ( ) | writes data to the device at the specified address |
| ReadAsynch ( ) | reads data from the device at the specified address |
| Configure ( ) | allows user to configure the device |
| Close ( ) | closes connection to the device |
| Open ( ) | opens connection to the device |
| VerifyLocation ( ) | indicates if the timestamp stored on the device is the same, newer or older than the specified version for the specified location |
| AbortRequest ( ) | cancels a previous asynchronous request |
| SaveProjectSettings ( ) | causes the device control object to save its project related information in the specified storage location |

Therefore, a plug-in COM object 44 would expose ICL_DeviceControl 88 to software tool 10 to access data, and software tool 10 is requested to use ICL_DeviceControlEvents 86 to notify COM object 44 when the task is completed. Both interfaces 86 and 88 may be replicated for plug-ins of each device, thus providing a standard method for communicating therewith.

Figure 5:
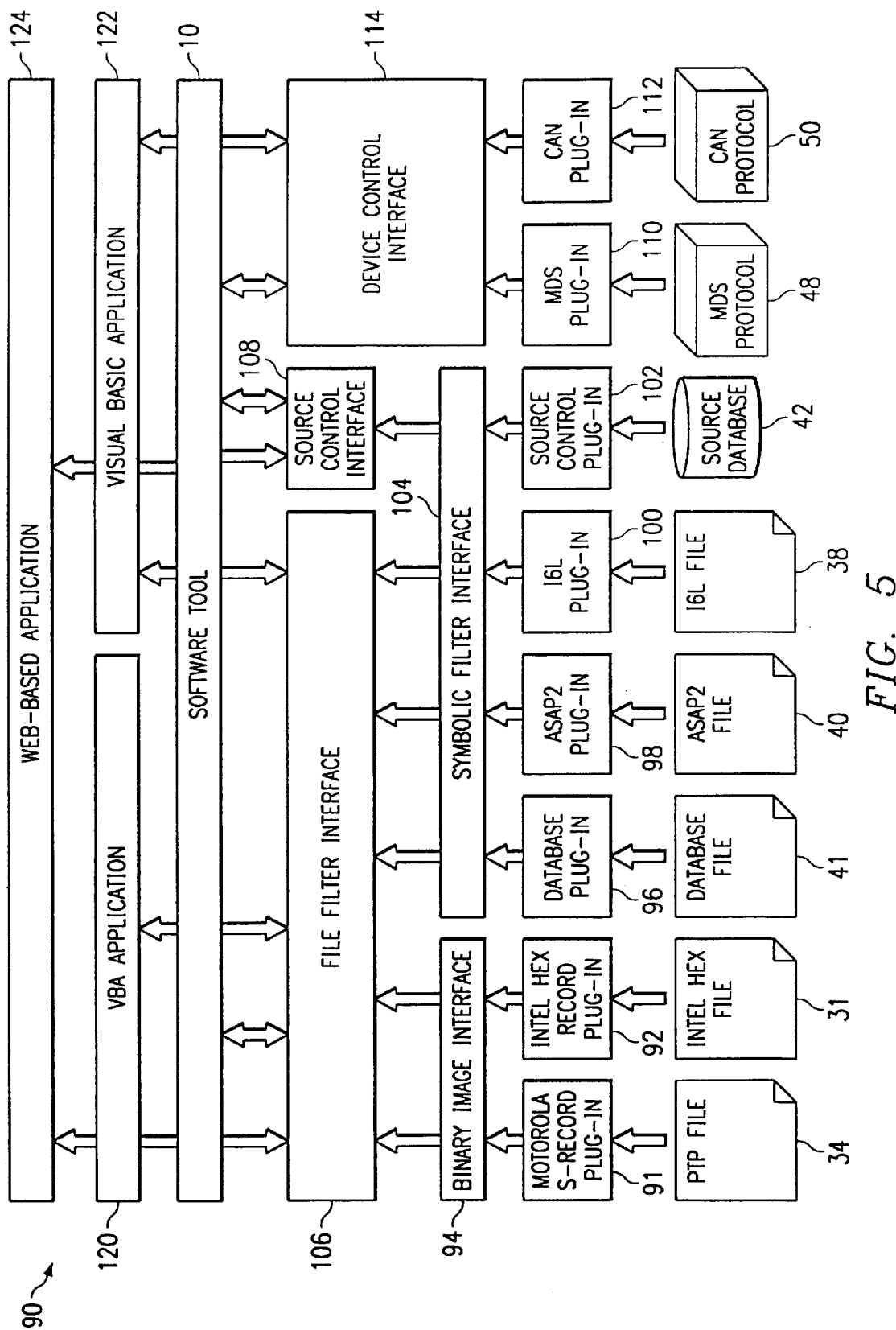
FIG. 5 is a block diagram of the layered architecture of the software tool interface architecture according to the teachings of the present invention.

FIG. 5 is a block diagram of a multi-layered software tool interface architecture 90 according to the teachings of the present invention. The bottom-most layer comprises plug-ins for different data formats of each file type or source. For example, Motorola S-Record plug-in 91 and Intel Hex plug-in 92 provide modular code to access a PTP file 34 and an Intel Hex file 31, respectively. A binary image interface layer 94 standardizes the communications interface between software tool 10 and the binary files 31 and 34. Similarly, a database plug-in 96, an ASAP2 plug-in 98, an I6L plug-in 100, and a source control plug-in 102 are used to access respective symbolic files and data sources 41, 40, 38, and 42. A symbolic filter interface layer 104 standardizes the communications between software tool 10 and the symbolic files. A source control interface layer 108 further standardizes the communications between software tool 10 and source database 42. Source database 42 may be version control data storage systems which has a predetermined set of protocol to check in and check out files. A file filter interface layer 106, disposed between binary image interface layer 94 and software tool 10, provides basic file manipulation functions, such as open file and save file, regardless of what type of files are involved. Embedded devices and controllers, such as those following MDS protocol 48 and CAN protocol 50, are accessible by an MDS plug-in 110 and a CAN plug-in 112, respectively. A device control interface layer 114, disposed between software tool 10 and the plug-ins 110 and 112, provide a standard communications interface.

Above file filter interface layer 106, source control interface layer 108, and device control interface layer 114 are software application layers. Software application layers may include, for example, software tool 10, Visual Basic for Applications (VBA) application layer 120, Visual Basic application layer 122, and web-based application layer 124. Application layers 10, 120, 122 and 124 are actually distinct and separate applications that need not and may not interact with one another. Thus, it may be seen that some of the arrows indicating data flow pass through one or more software application layers. Software tool 10 may be a calibration editor used to calibrate or fine tune calibration constants in an application. For example, a calibration constant may be a transmission shift point to achieve fuel economy, emissions control, or performance driving. Software tool 10 may also be more advanced calibration tools which are capable of analyzing and changing the calibration constants with the aide of computer models or iterative simulations. Other software tools which may interface with data files of diverse formats are also contemplated.

VBA and Visual Basic application layers 120 and 122 represent two examples of software applications which may perform functions other than as a software tool. For example, application layers 120 and 122 may be a word processing application such as Microsoft Word® or Corel WordPerfect®, a spread sheet program such as Excel® or Lotus 123®, which may benefit from the advantages of using the plug-ins to access data of diverse formats. Similarly, web-based application layer 124 may use plug-ins based on the distributed version of COM, DCOM, to enable communications over the Internet using transmission control protocol/Internet protocol (TCP/IP). Web-based applications may include applications written in HTML (hypertext markup language) and its many extensions to provide static or dynamic web content.

Software tool 10 and other applications may maintain a list of installed or enabled plug-ins with information regarding the type of data each is capable of processing. A user may select from a directory or list of available plug-ins or filters to use with a certain file format. Alternatively, the software application is capable of automatically selecting the correct plug-in to use with a given format. Microsoft's Component Category Manager® may be used to create categories and classify the plug-in COM objects.

It may be seen from the foregoing that standard interface methods are provided in combination with modular object-oriented plug-ins that enable a software application to access files or data having diverse data formats. Unlike typical plug-ins which are generally coded for a specific application, such as the Netscape Navigator web browser application, the plug-ins of the present invention need to be concerned only with a standard interface. As long as the software applications and plug-ins use the predefined methods of the standard filters and interfaces, compatibility is achieved. In this manner, plug-ins may be coded for each data format as needs arise or as a new data format is developed without altering or modifying the software tool or application itself.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A multi-layered software architecture, comprising:
   a software application layer;
   a predefined file filter interface layer operable to perform basic file functions, the file filter interface layer coupled to the software application layer;
   a data standard interface layer having a plurality of standard object-oriented methods for accessing data of a data type, the data standard interface layer coupled to the software application layer through the file filter interface layer;
   a first plug-in operable to access a first data format of the data type according to the data standard interface layer, the plug-in coupled to the file filter interface layer through the data standard interface layer; and
   a second plug-in operable to access a second data format of the data type according to the data standard interface layer, the plug-in coupled to the file filter interface layer through the data standard interface layer.

2. The multi-layered software architecture, as set forth in claim 1, wherein the software application layer comprises an embedded system software tool.

3. The multi-layered software architecture, as set forth in claim 1, wherein the software application layer comprises an embedded system software calibration editor.

4. The multi-layered software architecture, as set forth in claim 1, wherein the software application layer comprises an embedded system software analysis and calibration tool.

5. The multi-layered software architecture, as set forth in claim 1, wherein the data standard interface layer comprises a plurality of standard object-oriented methods for accessing data of a binary data format.

6. The multi-layered software architecture, as set forth in claim 1, wherein the data standard interface layer comprises a plurality of standard object-oriented methods for accessing data of a symbolic data format.

7. The multi-layered software architecture, as set forth in claim 1, wherein the data standard interface layer comprises a plurality of standard object-oriented methods for accessing data stored in a device.

8. The multi-layered software architecture, as set forth in claim 1, wherein the software application layer comprises a web-based application.

9. The multi-layered software architecture, as set forth in claim 1, further comprising:
   at least one second data standard interface layer having a second plurality of standard object-oriented methods for accessing data of a second data type, the second data standard interface layer coupled to the software application layer through the file filter interface layer; and
   at least one plug-in operable to access a data format of the second data type according to the second data standard interface layer, the plug-in coupled to the file filter interface layer through the second data standard interface layer.

10. An embedded software calibration system, comprising:
    a software tool operable to calibrate constants in a software application;
    at least one data interface plug-in in communications with the software tool and operable to access files of a first data type having a predetermined data format; and
    a data standard interface layer operable to facilitate communications between the at least one interface plug-in and the software tool.

11. The embedded software calibration system, as set forth in claim 10, wherein the at least one data interface plug-in is a binary interface plug-in in communications with the software calibration tool and operable to access binary data files having a predetermined binary data format.

12. The embedded software calibration system, as set forth in claim 11, wherein the binary interface plug-in is a software object having a plurality of standard methods operable to access the binary data files according to a predetermined binary file standard.

13. The embedded software calibration system, as set forth in claim 10, wherein the at least one data interface plug-in is a symbolic interface plug-in in communications with the software calibration tool and operable to access symbolic data files having a predetermined symbolic data format.

14. The embedded software calibration system, as set forth in claim 13, wherein the symbolic interface plug-in is a software object having a plurality of standard methods operable to access the symbolic data files according to a predetermined symbolic file standard.

15. The embedded software calibration system, as set forth in claim 10, wherein the at least one data interface plug-in is a device interface plug-in in communications with the software calibration tool and operable to access data stored in a device type having a predetermined data format.

16. The embedded software calibration system, as set forth in claim 15, wherein the device interface plug-in is a software object having a plurality of standard methods operable to access the device data according to a predetermined device control standard.

17. An embedded system software tool, comprising:
   a software tool;
   a data standard interface layer operable to facilitate communications between one or more interface plug-ins and the software tool;
   a binary interface plug-in in communications with the software tool and operable to access binary data files having a predetermined binary data format; and
   a symbolic interface plug-in in communications with the software tool and operable to access symbolic data files having a predetermined symbolic data format; and
   a device interface plug-in in communications with the software tool and operable to access data stored in a device type having a predetermined data format.

18. The software tool, as set forth in claim 17, wherein the software tool is a calibration constant editor.

19. The software tool, as set forth in claim 17, wherein the software tool is a calibration analyzer and simulator.

20. The software tool, as set forth in claim 17, wherein the binary interface plug-in is a software object having a plurality of standard object-oriented methods operable to access the binary data files according to a predetermined binary file standard.

21. The software tool, as set forth in claim 17, wherein the symbolic interface plug-in is a software object having a plurality of standard object-oriented methods operable to access the symbolic data files according to a predetermined symbolic file standard.

22. The software tool, as set forth in claim 17, wherein the device interface plug-in is a software object having a plurality of standard object-oriented methods operable to access the device data according to a predetermined device control standard.

23. The software tool, as set forth in claim 17, further comprising at least one project file used by the software tool to maintain data currently being processed.

24. The software tool, as set forth in claim 17, further comprising at least two project files used by the software tool to maintain two sets of data currently being processed, the software tool operable to display the at least two project files simultaneously.

25. The software tool, as set forth in claim 17, further comprising a web-based application layer.

26. The software tool, as set forth in claim 17, wherein the software tool is a web-based application.

27. A method of accessing data, comprising:
   selecting a data interface plug-in in response to a specific data type and format of input data;
   executing at a file filter interface layer a standard file function operable to perform file operations on the input data;
   executing at a data standard interface layer a standard data communication function operable to interface the input data of the specific data format from the data interface plug-in to the data standard interface layer; and
   communicating the interfaced input data from the data standard interface layer to a software tool.

28. The method, as set forth in claim 27, wherein selecting the data interface plug-in comprises selecting a binary data interface plug-in for a specific binary file format.

29. The method, as set forth in claim 27, wherein selecting the data interface plug-in comprises selecting a symbolic data interface plug-in for a specific symbolic file format.

30. The method, as set forth in claim 27, herein selecting the data interface plug-in comprises selecting a device interface plug-in for a specific device.

31. The method, as set forth in claim 27, wherein executing the standard data communication function comprises executing a standard function to access the input data according to a predetermined binary data interface standard.

32. The method, as set forth in claim 27, wherein executing the standard data communication function comprises executing a standard function to access the input data according to a predetermined symbolic data interface standard.

33. The method, as set forth in claim 27, wherein executing the standard data communication function comprises executing a standard function to access the input data according to a predetermined device interface standard.

* * * * *